March 26, 1935. T. J. MATASSA 1,995,515
COOKING DEVICE
Original Filed Feb. 2, 1931
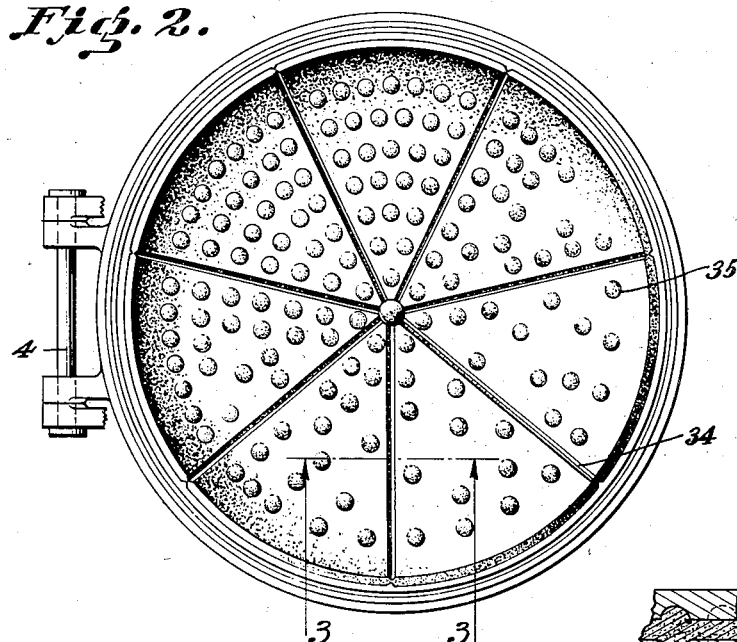
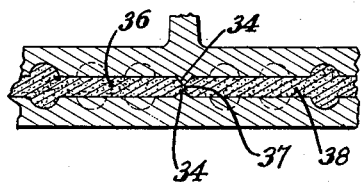
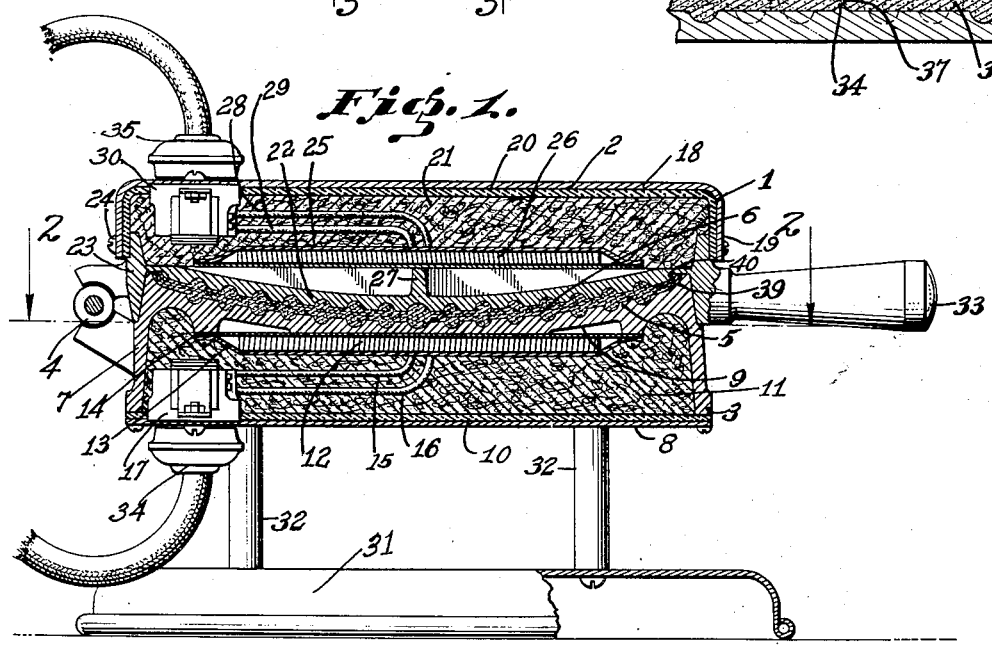
INVENTOR,
Thomas J. Matassa;
BY Calvin Brown
ATTORNEY Patented Mar. 26, 1935

1,995,515

UNITED STATES PATENT OFFICE 1,995,515

COOKING DEVICE

Thomas J. Matassa, Los Angeles, Calif.

Application February 2, 1931, Serial No. 512,839
Renewed October 1, 1934

1 Claim. (Cl. 53—10)

This invention relates to cooking devices, and particularly to that type of cooking device which is adapted to bake crust, such as pie crust.

The invention is particularly adaptable for commercial use although it may as readily be used by the housewife, in that the device about to be described will bake the top crust for a pie and likewise score the crust by providing weakened zones whereby the pie may be cut into a selected number of segmental pieces of equal or approximately equal size. Generally in the restaurant and café trade, unless the restaurant has a checker, often the size of a piece of pie will vary in accordance with the particular whim of the person cutting the pie. To customers, this is noticeable and it is with the idea of overcoming discrepancy in the size of the pieces of pie served that the present invention is primarily directed. I have described in a copending application Serial No. 485,479, filed September 30, 1930, for Cooking devices, a device which is adapted to bake the lower portion of pie crust, and the present invention may cooperate with the first mentioned invention to bake a top crust. In my former invention, I may or may not have to have a top crust, although if I do need a top crust for a pie, such as apple, pineapple, and the like, the top crust may be baked properly and placed over the other crust member known as the bottom crust.

It is within the objects of my invention to provide a crust having various ornamentations as may be desired.

Other objects of the invention comprise a device which is simple of structure, easy to use, produces well baked crust, and which is superior to ordinary methods of baking.

With the above and other objects in view, the invention consists in the novel and useful provision, formation, construction, association, and relative arrangement of parts, members and features, all as shown in a certain embodiment in the accompanying drawing, described generally, and more particularly pointed out in the claim.

In the drawing:

Figure 1 is a transverse sectional view of a device incorporating the invention, Figure 2 is a sectional view on the line 2—2 of Figure 1, and, Figure 3 is a fragmentary sectional detail on the line 3—3 of Figure 2.

Referring to the drawing, I have shown the device as an entirety in Figure 1, and the same includes a body 1 including a pair of cooperating members 2 and 3 maintained in hinged relation by means 4. The members 2 and 3 constitute top and bottom members respectively. The member 3 is provided with a dough or batter receiving and molding member 5, the face 6 of which is concave. An annular flange 7 may be integrally formed with said member 5 and along the marginal edges thereof. Adapted to be secured to the flange and to bridge the cap included by said flange is a closure plate 8. Included between the bottom face 9 of member 5 and an insulating member 10 is a mineral wool 11, which acts as a heat resistant element. This mineral wool lies adjacent a heating coil 12 which is enclosed within a shell designated generally as 13. This shell is in direct contact, in the present instance, with the member 5. An annular flange 14 is adapted to receive screws or like objects passed through the shell 13 for maintaining said shell, with its associated heating means 12, against the bottom face of the member 5. The fibrous material 11 functions in the ordinary manner to prevent dissipation of heat outward of the heating element 12. Suitable electrical conductors 15 and 16 connect with the heating element 12 and with a socket 17. This socket is secured to the plate 8. The top 2 includes a shell 18 having a depending rim flange 19 within the confines of which is an insulating member 20, which insulating member in turn is adapted to confine further insulating material, such as mineral wool, 21. The said shell 18 along with the insulating material 20 is adapted to be secured to the top heating and molding member 22, the face of which member is convex. This member 22 is formed with a rim flange 23, and the members 18 and 20 are secured to a portion of this rim flange, as shown best in Figure 1, by any suitable means, such as by screws shown at 24. A further portion of said rim flange cooperates with the flange 7 of the lower mold member. A shell 25 is adapted to encase a heating element 26 and this shell is secured in any suitable manner to one or more ribs 27 formed on the concave surface of the member 22. Suitable conductors 28 and 29 connect with said heating element and with a socket 30, this socket being embedded in the mineral wool 21 and carried by the shell 18.

A base 31 is adapted to have extending from the top surface thereof pillars or posts 32, and said pillars or posts are in turn secured to the bottom plate 8. A handle 33 is secured to the rim flange 23. Plugs 34 and 35 may be inserted in the sockets 17 and 30, respectively, which plugs through the medium of conductors communicate with a suitable source of electricity, whereby the elements 12 and 26 may be heated to in turn heat the top and bottom molds.

As stated in the objects of the invention, the top and bottom molds have the face portions thereof provided with radial ribs 34. These ribs are spaced apart any degree desired. The face portions of both said molds may likewise be provided with the usual concave depressions 35, although this is not absolutely essential. As stated in the objects, these portions 35 may assume any configuration desired for the purpose of ornamentation. The radial ribs of the top and bottom molds are oppositely disposed, as shown best in Figure 3 so that any dough or batter 36 disposed between said molds may have a zone of relative thinness with respect to the general body portion of said dough for instance, as shown at 37 with respect to the portion 38.

Attention is likewise directed to a further feature of the invention. The face portion of the bottom mold 5 is so arranged that adjacent the marginal edges there is an abrupt upward curve, as shown at 39, and the top mold is correspondingly formed as shown at 40.

The operation, uses and advantages of the invention are as follows:

If it is assumed that the device is hot by passage of electricity through the heating elements thereof, the cover or top may be swung upward relative to the lower or base portion and the dough or batter poured upon the concave face of the lowermost mold. This dough or batter will, of course, fill the various interstices on said face. The top mold is then pressed downwardly, as shown in Figure 1, and the dough or batter will then be forced into the interstices of the convex face of said top mold. Of course, the top mold cannot be pressed tightly against the concave face of the lower mold because the dough would be squeezed from between said faces and as a result the elements are so associated that there is a normal spacing between said molds when the molds are closed to working relation. The dough or batter will generally conform to the character of the mold and appear as shown in the cross section of Figure 1. After the dough has been baked, the time element being determined by experiment, the baked crust may be removed. This crust may then be placed over the bottom pie crust forming a top therefor. It will be noted that the edges or rim portion of the crust depend downwardly and, as a consequence, the top crust will fit within the bottom crust. It is assumed, of course, that the bottom crust has been filled.

It is only necessary to follow the scored lines of the top crust to cut the pie into even pieces.

From a commercial standpoint the invention is extremely valuable because a battery of these devices may be utilized and the baking of the crusts will be uniform. This is essential when pies or like pastry elements are baked in commercial lots because guesswork must be removed.

It is obvious that various changes and modifications and variations may be made in practicing the invention in departure from the particular showing of the drawing and description as given without departing from the true scope of the invention as defined by the appended claim.

I claim:

A device for baking the top crusts of pies comprising a bottom section, means for supporting said bottom section, a top section hinged to said bottom section, a heating element carried within said bottom section, a heating element carried within said top section, said bottom section having a dished upper face and said top section having a bowed bottom face conforming to the configuration of a bottom section, said top section having a peripheral edge ring adapted to engage and extend below the top edge of said bottom section to maintain the adjacent faces of said sections in slightly spaced relation to receive a pie crust dough therebetween with the edge of said ring serving to enclose a space between the faces of said sections, and radially disposed ribs on the face portion of one of said sections to provide score lines in the dough to be baked between said sections.

THOMAS J. MATASSA.